United States Patent [19]

Nelson et al.

[11] Patent Number: 4,594,398

[45] Date of Patent: Jun. 10, 1986

[54] VINYL ESTER RESINS FROM GLYCIDYL ETHERS OF REACTION PRODUCT OF A PHENOL AND UNSATURATED HYDROCARBONS

[75] Inventors: Donald L. Nelson; Mary J. Lamont, both of Lake Jackson, Tex.

[73] Assignee: The Dow Chemical Company, Midland, Mich.

[21] Appl. No.: 737,593

[22] Filed: May 24, 1985

Related U.S. Application Data

[63] Continuation-in-part of Ser. No. 655,406, Sep. 28, 1984, abandoned.

[51] Int. Cl.$^4$ ............................................. C08F 283/10
[52] U.S. Cl. ...................................... 525/531; 525/922
[58] Field of Search ................................ 525/531, 922

[56] References Cited

U.S. PATENT DOCUMENTS

| | | | |
|---|---|---|---|
| 3,674,893 | 7/1972 | Nowak et al. | 525/531 |
| 4,348,506 | 9/1982 | Ganguli et al. | 525/512 |
| 4,390,680 | 6/1983 | Nelson | 528/97 |
| 4,394,497 | 7/1983 | Nelson et al. | 528/97 |

Primary Examiner—John C. Bleutge
Assistant Examiner—Robert E. L. Sellers, II
Attorney, Agent, or Firm—J. G. Carter

[57] ABSTRACT

Vinyl ester resins are prepared by reacting a polymerizable unsaturated carboxylic acid-containing compound with an epoxy resin prepared by dehydrohalogenating the reaction product of an epihalohydrin with the reaction product of an aromatic hydroxyl-containing compound and an unsaturated hydrocarbon.

50 Claims, No Drawings

VINYL ESTER RESINS FROM GLYCIDYL ETHERS OF REACTION PRODUCT OF A PHENOL AND UNSATURATED HYDROCARBONS

CROSS REFERENCE TO RELATED APPLICATION

This is a continuation-in-part of copending application Ser. No. 655,406 filed Sept. 28, 1984, now abandoned.

BACKGROUND OF THE INVENTION

The present invention pertains to vinyl ester resins prepared from epoxy resins derived from the reaction product of an aromatic hydroxyl-containing compound and unsaturated hydrocarbons.

Vinyl ester resins are conventionally prepared from epoxy resins and unsaturated carboxylic acids or half esters of such acids as disclosed by R. L. Bowen in U.S. Pat. No. 3,066,112, by C. R. Bearden in U.S. Pat. No. 3,367,992 and by D. H. Swisher and D. C. Garms in U.S. Pat. No. 3,564,074.

The vinyl ester resins of the present invention provide for an improvement in one or more properties such as chemical resistance, moisture resistance or electrical properties.

SUMMARY OF THE INVENTION

The present invention concerns vinyl ester resin compositions comprising:
(I) from about 30 to about 100, preferably from about 40 to about 70 percent by weight of a vinyl ester resin prepared by reacting:
  (A) at least one unsaturated monocarboxylic acid;
  (B) at least one epoxy resin prepared by dehydrohalogenating the reaction product of:
    (1) an epoxy alkyl halide and
    (2) the reaction product of
      (a) an aromatic hydroxyl-containing material having from one to two aromatic rings and at least one ortho or para position with respect to the hydroxyl group available for ring alkylation with
      (b) an unsaturated hydrocarbon; and optionally
  (C) at least one dicarboxylic acid anhydride; and
(II) from about zero to about 70, preferably from about 30 to about 60 percent by weight of a polymerizable ethylenically unsaturated monomer.

Components (B-2-a) and (B-2-b) are employed in quantities which provides a mole ratio of (B-2-a) to (B-2-b) of from about 1.8:1 to about 30:1, preferably from about 1.8:1 to about 20:1 and components (B-1) and (B-2) are employed in quantities which provide an epoxy group to phenolic hydroxyl group ratio of from about 1.5:1 to about 20:1, preferably from about 3:1 to about 5:1, it being fully understood that the excess aromatic hydroxyl-containing material and epoxy alkyl halide are removed from the product.

The present invention also pertains to the product resulting from polymerizing the aforesaid vinyl ester resin composition in the presence of a suitable quantity of at least one suitable polymerization catalyst optionally also in the presence of a suitable quantity of a suitable accelerating agent.

DETAILED DESCRIPTION OF THE INVENTION

Suitable ethylenically unsaturated monocarboxylic acids which can be employed herein include, for example, the α,β-unsaturated monocarboxylic acids and the hydroxyalkyl acrylate or methacrylate half esters of dicarboxylic acids. The α,β-unsaturated monocarboxylic acids include acrylic acid, methacrylic acid, crotonic acid, cinnamic acid and the like. The hydroxyalkyl groups of the acrylate or methacrylate half esters preferably contains from two to six carbon atoms and includes such groups as hydroxyethyl, beta-hydroxypropyl, beta-hydroxybutyl and the like. It is also intended to include those hydroxyalkyl groups in which an ether oxygen is present. The dicarboxylic acids or acid anhydrides can be either saturated or unsaturated. Saturated acids include phthalic acid, phthalic anhydride, chlorendic acid, chlorendic anhydride, tetrabromophthalic acid, tetrabromophthalic anhydride, adipic acid, succinic acid, glutaric acid and the like. Unsaturated dicarboxylic acids include maleic acid, maleic anhydride, fumaric acid, citraconic acid, citraconic anhydride, itaconic acid, halogenated maleic or fumaric acids, mesaconic acid and the like. Mixtures of ethylenically unsaturated carboxylic acids or anhydrides may be used.

Preferably, the half esters are prepared by reacting substantially equal molar proportions of a hydroxyalkyl acrylate or methacrylate with a dicarboxylic acid anhydride. Preferred unsaturated anhydrides include maleic anhydride, citraconic anhydride, and the like and preferred saturated anhydrides include phthalic anhydride, tetrabromophthalic anhydride, chlorendic anhydride and the like. Advantageously, a polymerization inhibitor, such as the methyl ether of hydroquinone or hydroquinone, may be added since elevated temperatures are useful in preparing the half esters. The reaction temperature may range from 20° to 150° C., but preferably from 80° to 120° C.

The polyepoxide is reacted with the ethylenically unsaturated monocarboxylic acid either with or without a solvent at a temperature of 20° to 120° C. The reaction may also be conducted in the presence or absence of suitable catalysts such as alcoholates, tertiary amino phenols or others well known to the art. Preferably, the polyepoxide is added in an amount sufficient to provide about 0.8 to 1.2 equivalents of epoxide per equivalent of carboxylic acid. The reaction is continued until the acid content (as —COOH) drops below about 2 percent by weight.

If desired, the ethylenically unsaturated monocarboxylic acid-polyepoxide reaction product containing secondary hydroxyl groups is further reacted with about 0.1 to 1.2 mole proportions of dicarboxylic acid anhydride per equivalent of epoxide. The dicarboxylic acid anhydride may be selected from either the saturated or unsaturated dicarboxylic acid anhydrides previously recited or mixtures thereof. A reaction temperature from about 25° to 150° C. is suitable, but about 80° to 120° C. is preferred. Also, if desired, the dicarboxylic acid anhydride, the ethylenically unsaturated monocarboxylic acid and the epoxy resin can be reacted simultaneously.

Suitable aromatic hydroxyl-containing compounds which can be employed herein include any such halogen free compounds which contain one or two aromatic rings, at least one phenolic hydroxyl group and at least one ortho or para ring position with respect to a hydroxyl group available for alkylation.

Particularly suitable aromatic hydroxyl-containing compounds which can be employed herein include, for example, phenol, methylphenol, hydroquinone, catechol, resorcinol, guaiazol, pyrogallol, phloroglucinol, isopropylphenol, ethylphenol, propylphenol, t-butylphenol, isobutylphenol, octylphenol, nonylphenol, cumylphenol, p-phenylphenol, o-phenylphenol, m-phenylphenol, bisphenol A, dihydroxydiphenyl sulfone, mixtures thereof and the like.

Suitable unsaturated hydrocarbons which, either in a crude or purified state, can be employed herein include, for example, butadiene, isoprene, piperylene, cyclopentadiene, cyclopentene, 2-methyl butene-2, cyclohexene, cyclohexadiene, methyl cyclopentadiene, dicyclopentadiene, limonene, dipentene, linear and cyclic dimers of piperylene, methyl dicyclopentadiene, dimethyl dicyclopentadiene, norbornene, norbornadiene, ethylidiene norbornene, mixtures thereof and the like. Also suitable unsaturated hydrocarbons include the other dimers, codimers, oligomers and cooligomers of the aforementioned unsaturated hydrocarbons. Particularly suitable unsaturated hydrocarbons which can be employed herein include, for example, essentially pure dicyclopentadiene, a dicyclopentadiene concentrate containing from about 70 to about 97 percent by weight of dicyclopentadiene; from about 3 to about 30 percent by weight of $C_9$–$C_{12}$ dimers or codimers of $C_4$–$C_6$ dienes such as, for example, cyclopentadiene-isoprene, cyclopentadiene-piperylene, cyclopentadiene-methyl cyclopentadiene, and/or dimers of isoprene, piperylene, methyl cyclopentadiene and the like; from about zero to about 7 percent by weight of $C_{14}$–$C_{18}$ trimers of $C_4$–$C_6$ dienes and from about zero to about 10 percent by weight of aliphatic diolefins such as, for example, piperylene, isoprene, 1,5-hexadiene and cyclic olefins such as cyclopentadiene, methyl cyclopentadiene, cyclopentene and the like. Methods of preparation for these dicyclopentadiene concentrates and more detailed descriptions thereof can be found collectively in U.S. Pat. No. 3,557,239 issued to Gebhart et al and U.S. Pat. No. 4,167,542 issued to Nelson, both of which are incorporated herein by reference.

Also, particularly suitable unsaturated hydrocarbons which can be employed herein include a crude dicyclopentadiene stream containing from about 20 to about 70 percent by weight dicyclopentadiene, from about 1 to about 10 percent codimers and dimers of $C_4$–$C_6$ hydrocarbons (described above), from about zero to about 10 percent oligomers of $C_4$–$C_6$ dienes and the balance to provide 100 percent, $C_4$–$C_6$ alkanes, alkenes and dienes.

Also, particularly suitable unsaturated hydrocarbons which can be employed herein include a crude piperylene or isoprene stream containing from about 30 to about 70 percent by weight piperylene or isoprene, about zero to about ten percent by weight $C_9$–$C_{12}$ dimers and codimers of $C_4$–$C_6$ dienes, and the balance to provide 100% $C_4$–$C_6$ alkanes, alkenes and dienes.

Also, particularly suitable are hydrocarbon oligomers prepared by polymerization of the reactive components in the above hydrocarbon streams e.g., dicyclopentadiene concentrate, crude dicyclopentadiene, crude piperylene or isoprene, individually or in combination with one another or in combination with high purity diene streams.

Suitable acid catalysts which can be employed herein include, for example, Lewis Acids, alkyl, aryl and aralkyl sulfonic acids and disulfonic acids of diphenyloxide and alkylated diphenyloxide, sulfuric acid, mixtures thereof and the like.

Particularly suitable are such Lewis Acids as $BF_3$ gas, organic complexes of boron trifluoride such as those complexes formed with phenol, cresol, ethanol, acetic acid and the like. Also suitable Lewis acids include aluminum chloride, zinc chloride, stannic chloride, and the like.

Also suitable catalysts include, for example, activated clays, silica, silica-alumina complexes, and the like.

Suitable epoxy alkyl halides which can be employed herein include those represented by the formula

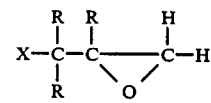

wherein each R is independently hydrogen or an alkyl group having from 1 to about 6 carbon atoms and X is a halogen.

Particularly suitable epoxy alkyl halides include, for example, epichlorohydrin, epibromohydrin, epiiodohydrin, methylepichlorohydrin, methylepibromohydrin, methylepiiodohydrin, mixtures thereof and the like. Advantageously, a suitable vinyl polymerization inhibitor such as the methyl ether of hydroquinone, phenothiazine or hydroquinone and the like may be added. Following completion of the reaction, the reaction mixture is cooled and the polymerizable monomer may be blended therewith.

A wide selection of polymerizable monomers containing the $>C=CH_2$ group is available from the many known classes of vinyl monomers. Representative species are the vinyl aromatic compounds which include such monomers as styrene, vinyl toluene, halogenated styrenes, p-t-butyl styrene, divinyl benzene and the like.

Other suitable monomers include the methyl, ethyl, isopropyl, octyl, etc., esters of acrylic or methacrylic acid, vinyl acetate, diallyl maleate, diallyl phthalate, dimethallyl fumarate, acidic monomers such as acrylic acid, methacrylic acid, crotonic acid and amide monomers such as acrylamide, N-alkyl acrylamides and the like and mixtures thereof.

Preferred polymerizable monomers containing the $>C=CH_2$ group are styrene, vinyl toluene, ortho-, meta- and para-halostyrenes, vinyl naphthalenes, the various alpha-substituted styrenes, as well as the various di-, tri- and tetrahalo styrenes, and acrylic, methacrylic and crotonic acid esters which include both the saturated alcohol esters and the hydroxyalkyl esters.

The blended vinyl ester resin composition may consist of up to 70 percent by weight of polymerizable monomer containing the $>C=CH_2$ group with the balance of the combined weight consisting of said vinyl ester resin. Preferably, the resin composition consists of 30–60 percent by weight of said monomer and 70–40 percent by weight of said vinyl ester resin.

While it is preferred in many applications to blend the vinyl ester resin with a polymerizable monomer, the present invention is not limited thereto. The vinyl ester resin can be cured and polymerized in the absence of such a monomer and can be applied and utilized as solutions in a nonpolymerizable solvent, such as is practiced in certain coating operations.

According to the present invention, the curing of the resin compositions is effected by the application of heat and/or pressure in the presence of a free radical yielding catalyst. Catalysts that may be used for the curing or polymerization are preferably the peroxide catalysts, such as benzoyl peroxide, lauroyl peroxide, t-butyl hydroperoxide, t-butylperbenzoate, methyl ethyl ketone peroxide, potassium persulfate and the like. The amount of the catalyst added will preferably vary from 0.1 to about 5 percent by weight of reactants. Temperatures employed may vary over a considerable range but usually are in the range of 20° to 250° C.

Additionally, more rapid curing of the thermosetting resin compositions may be accomplished by the addition of accelerating agents such as lead or cobalt naphthenate, dimethylaniline and the like, usually in concentrations ranging from 0.1 to 5.0 weight percent.

The relatively low molecular weight of the vinyl ester resins of the present invention along with the rapid gel time, high heat distortion and fast cure rate of the thermosetting resin compositions provide many advantages and improved properties in a wide variety of applications.

Pottings and castings are conveniently made by the addition of suitable curing agents and accelerating agents to the resin composition followed by pouring into an appropriate mold or casting and curing at room temperature. Heat may be applied to hasten the cure. Such cured castings have excellent flexural and tensile strength, good impact resistance and develop smooth, hard surfaces.

In addition, the resultant lower viscosity of said resin compositions allows the incorporation of up to as much as 75 percent by weight or more of inert additives and fillers such as glass, metal filings and inorganic fillers such as sand or clay. The resin compositions, in spite of this heavy loading, exhibit excellent flow characteristics in the molding operation. Frequently such fillers are added to further improve and vary the useful properties of the cured compositions. Such cured products develop excellent hardness, strength, weatherability and solvent resistance. Other commonly used additives, such as pigments, release agents, plasticizers and the like, may be advantageously added.

Of particular utility is the use of the present invention in the preparation of reinforced plastic and laminate structures. Reinforcing media may be chosen from many well known suitable materials such as glass cloth and matting, paper, asbestos paper, mica, fabrics and the like. Suitable fillers, previously described, are frequently used to provide improved properties. For example, clays are suggested where improved exterior weathering properties are required. In addition to the advantages and improved properties already recited, this invention provides better glass wetting and increased resistance to stress cracking than unsaturated polyester resins.

EXAMPLE 1

A. Reaction of Phenol with a $C_{10}$ Diene Stream

To a reactor equipped with a stirrer, condenser, thermowell and heater, add 1882 gms (20 moles) of phenol and 8 gms (0.4% based on total weight) of boron trifluoride etherate. Heat to 70° C. and add 132 gms ($\cong$1 mole) of a $C_{10}$ diene stream, containing mainly dicyclopentadiene and cyclopentadiene-isoprene codimers, over a 20-minute (1200 s) period. The temperature was increased to 150° C. over a 3-hour (10,800 s) time period and held for about 3 hours (10,800 s). The unreacted phenol was distilled off with a finishing temperature of 210° C. and less than 5 mm Hg. The recovered product was a dicyclopentadiene bisphenol with an average functionality of 2.07.

B. Preparation of Epoxy Resin

To a reactor equipped with a stirrer, condenser, nitrogen sparge, thermowell and addition funnel were added 805 gms (5 OH equivalents) of the product prepared in Example 1-A, 900 gms of the methyl ether of propylene glycol, 20 gms of water, 2 gms of 50% NaOH and 2312.5 gms (25 moles) of epihalohydrin. The solution was heated to 70° C. 909.1 gms (5 moles) of 22% NaOH was added over a 2-hour and 37 minute (9420 s) time period. The reaction was held at 70° C. for an additional 52 minutes (3120 s). The resin was transferred to a separating funnel where the brine and resin layers were allowed to separate. The brine layer was discarded, the resin solution was returned to the reaction flask, and 139 gms of the methyl ether of propylene glycol was added. The mass was heated to 69° C. and 200 gms (1.25 moles) of 25% NaOH was added over a 21-minute (1260 s) period and then allowed to react an additional 75 minutes (4500 s). The resin was transferred to a separating funnel, the brine layer drawn off, washed with water and the water layer removed. The resin was returned to the reactor where the methyl ether of propylene glycol and excess epichlorohydrin were removed by vacuum distillation. The resin was finished at 155° C. and 3 mm Hg. The resin was a semi-solid at room temperature with an epoxy equivalent weight of about 245.

C. Preparation of Vinyl Ester Resin

To a reactor equipped with a heater, temperature controller, stirrer and gas sparge tube, 612.5 gms (2.5 eq) of the epoxy resin prepared in Example 1-B was added and heated to 80° C. 0.17 gms of hydroquinone was added and blended by stirring. 215.0 gms (2.5 eq) of methacrylic acid and 0.92 gms of DMP-30 (dimethylaminomethyl phenol) were added. The mass was heated to 115° C. and reacted for 3 hours (10,800 s). The unreacted acid content was 2.5% and the unreacted oxirane content was 3.2%. An additional 6.2 gms (0.17 eq) of methacrylic acid was added and reacted for 2.5 hours (9000 s) at 120° C. The COOH content was 1.0% and the epoxy content was 0.5%. The reactants were cooled to about 110° C. and blended with 678 gms (45%) styrene inhibited with 0.3 gms of methyl hydroquinone and 0.23 gms of phenothiazine.

D. Curing of the Vinyl Ester Resin

A clear casting was made from the vinyl ester resin prepared in Example 1-D above using 0.3% by weight cobalt naphthenate (6%), 0.2% by weight N,N-dimethyl toluidine and 1.0% methylethyl ketone peroxide. After 16 hours (57,600 s), a post treatment of 2 hours (7200 s) at 155° C. was provided.

EXAMPLE 2

A. Reaction of Phenol with a $C_5$–$C_{10}$ Crude Hydrocarbon Stream

To a reactor equipped as in Example 1-A were added 1035.1 gms (11 moles) of phenol and 9.5 gms of $BF_3$ etherate in 200 gms of toluene. The temperature was set at 40° C. A crude hydrocarbon stream containing mainly alkanes, alkenes and dienes in the $C_5$ to $C_{10}$ range, 355.5 gms (estimated at 3.33 moles of active product) was added over a 7-hour and 3 minute (25,380 s) time period. A summary analysis of this stream was as follows:

| | |
|---|---|
| n-pentane | 5.8 wt. % |
| trans-pentane-2 | 1.6 wt. % |
| cis-pentane-2 | 1.5 wt. % |
| 2-methyl butane-2 | 4.1 wt. % |
| trans-piperylene | 16.3 wt. % |
| cis-piperylene | 10.8 wt. % |
| cyclopentene | 10.1 wt. % |
| dicyclopentadiene | 34.0 wt. % |
| cyclopentadiene/isoprene $C_{10}$ | 3.4 wt. % |
| remainder | 12.4 wt. % |

During the addition time, the temperature was in the 38° C. to 45° C. range. The reaction mass was heated to 145° C. over about 5 hours (18,000 s). During this time, 36 gms of unreacted hydrocarbon was removed. After about 2 hours (7200 s) of slight vacuum, an additional 431 gms of hydrocarbon toluene and phenol were removed. Full vacuum at 210° C. and 0 mm mercury resulted in an additional 565 gms of phenol and $C_5$ alkylated phenol.

B. Preparation of Epoxy Resin

To a reactor equipped as in Example 1-B were added 316 gms (2 OH eq.) of the hydrocarbon phenolic prepared in Example 2-A, 320 gms of the methyl ether of propylene glycol, 7 gms of water, 2 gms of 50% sodium hydroxide in water, and 740 gms (8 moles) of epichlorohydrin. The solution was heated to 70° C. 363.6 gms (2 moles) of 22% caustic was added over a 55-minute (3300 s) time period. The reaction was held at 70° C. for an additional 36 minutes (2160 s). The resin was transferred to a separating funnel where the brine and resin layers were allowed to separate. The brine layer was discarded, the resin solution returned to the reaction flask and 32 gms of the methyl ether of propylene glycol added. The mass was heated to 70° C. and 80 gms (0.5 moles) of 25% was added over a 12-minute (720 s) period and then allowed to react for an additional hour (3600 s). The resin was transferred to a separating funnel, the brine layer drawn off, washed with water and the water layer removed. The resin was returned to the reactor where the methyl ether of propylene glycol and excess epichlorohydrin were removed by vacuum distillation. The resin was finished at 155° C. and 4 mm Hg. The resin was a semi-solid at room temperature with an epoxide equivalent weight of 231.5.

C. Preparation of a Vinyl Ester Resin

To a reactor equipped as in Example 1-C were added 231.5 gms (1.0 moles) of the epoxy resin prepared in Example 2-B and 0.29 gms of ethyl triphenyl phosphonium acetate. The components were heated to 125° C. and held for 1 hour (3600 s). The temperature was reduced to 100° C. and 0.19 gms hydroquinone, 72.1 gms (0.84 moles) of methacrylic acid and 0.07 gms of chromium chloride were added separately and with good mixing. The components were reacted for 3 hours and 45 minutes (13,500 s) at 118° C. 248.9 gms (45%) styrene and 0.12 gms of phenothiazine were added under agitation conditions.

D. Curing of the Vinyl Ester Resin

The sample was cured with 0.2% by weight N,N-dimethyl toluidine, 0.5% by weight cobalt naphthenate (6%), and 2.0% by weight methyl ethyl ketone peroxide at room temperature. After 16 hours (57,600 s) and before release from the mold, a post cure of 2 hours (7200 s) at 155° C. was provided.

COMPARATIVE EXPERIMENT A

A vinyl ester resin prepared by reacting a mixture of a diglycidyl ether of bisphenol A having an EEW of 535 and a diglycidyl ether of bisphenol A having an EEW of about 186–192, the resultant blend having an EEW of about 361 was reacted with glacial methacrylic acid at a ratio of 1.0 equiv. of acid and 1.0 equiv. of epoxide at a temperature of about 115° C. until the acid content was less than about 1.2%. This product was then blended with styrene such that the resultant blend contained about 45% styrene by weight. The resultant blend was cured as in Examples 1-D and 2-D.

Each of the cured products from Examples 1-D, 2-D and Comparative Experiment A were subjected to physical testing and chemical solvent resistance. The results are given in the following table.

| PROPERTY | EXAMPLE 1-D | EXAMPLE 2-D | COMPARATIVE EXPERIMENT A |
|---|---|---|---|
| FLEXURAL STRENGTH[1], psi | 22,500 | 23,000 | 21,000 |
| , MPa | 155 | 158 | 145 |
| FLEXURAL MODULUS[1], psi | $6.1 \times 10^5$ | $6.1 \times 10^5$ | $5.5 \times 10^5$ |
| , KPa | $42.1 \times 10^5$ | $42.1 \times 10^5$ | $37.9 \times 10^5$ |
| TENSILE STRENGTH[2], psi | 8,200 | 11,200 | 11,600 |
| , MPa | 57 | 77 | 80 |
| ELONGATION, % | 1.6 | 3.5 | 4.2 |
| HEAT DISTORTION[3], °F. | 266 | 186 | 210 |
| , °C. | 130 | 86 | 99 |
| 24-HOUR SOLVENT ABSORPTION[4] | | | |
| TOLUENE, % weight gain | 0.03 | 0.04 | 0.02 |
| WATER, % weight gain | 0.16 | 0.12 | 0.12 |
| ACETONE, % weight gain | 3.27 | 7.2 | >4.50 |
| METHANOL, % weight gain | 0.46 | 0.70 | 1.50 |

[1]Test was conducted according to the procedure of ASTM D 790-71.
[2]Test was conducted according to the procedure of ASTM D 638-72.
[3]Test was conducted according to the procedure of ASTM D 648.
[4]This test was conducted on 1" × 3" (25.4 mm × 193.5 mm) clear casting coupons. Solvent resistance was determined from the percent weight-gain observed after 24 hours (86,400 s) in a room temperature solvent bath.

We claim:
1. A vinyl ester resin composition comprising:
(I) from about 30 to about 100 percent by weight of a vinyl ester resin prepared by reacting
(A) at least one unsaturated monocarboxylic acid;

(B) at least one epoxy resin prepared by dehydrohalogenating the reaction product of
  (1) an epoxy alkyl halide and
  (2) the reaction product of
    (a) an aromatic hydroxyl-containing material having from one to two aromatic rings and at least one ortho or para position with respect to the hydroxyl group available for ring alkylation with
    (b) at least one unsaturated hydrocarbon selected from
      (i) mono- and diunsaturated hydrocarbons containing 4 to 6 carbon atoms and
      (ii) unsaturated hydrocarbons containing an average of 7–55 carbon atoms per molecule; and optionally
  (C) at least one dicarboxylic acid anhydride; and
(II) from about zero to about 70 percent by weight of a polymerizable ethylenically unsaturated monomer;
wherein Components (B-2-a) and (B-2-b) are employed in quantities which provides a mole ratio of (B-2-a) to (B-2-b) of from about 1.8:1 to about 30:1 and components (B-1) and (B-2) are employed in quantities which provide an epoxy group to phenolic hydroxyl group ratio of from about 1.5:1 to about 20:1, it being fully understood that the excess aromatic hydroxyl-containing material and epoxy alkyl halide are removed from the product.

2. A vinyl ester resin composition of claim 1 wherein
  (i) component I is present in a quantity of from about 40 to about 70 percent by weight;
  (ii) component II is present in a quantity of from about 30 to about 60 percent by weight;
  (iii) components (I-B-2-a) and (I-B-2-b) are employed in quantities which provide a ratio of from about 1.8:1 to about 20:1;
  (iv) components (I-B-1) and (I-B-2) are employed in quantities which provides a ratio of about 3:1 to about 5:1; and
  (v) component (I-B-1) is an epihalohydrin.

3. A vinyl ester resin composition of claim 2 wherein
  (i) component (I-A) is acrylic acid or methacrylic acid;
  (ii) component (I-B-1) is epichlorohydrin; and
  (iii) component II is styrene, vinyl toluene, chloro styrene, methyl methacrylate, diallyl phthalate or a mixture of any two or more of such materials.

4. A vinyl ester resin composition of claims 1, 2 or 3 wherein component (I-B-2-b) is essentially pure dicyclopentadiene.

5. A vinyl ester resin composition of claim 4 wherein component (I-B-2-a) is phenol, resorcinol, $C_1$ to $C_9$ alkyl phenol or mixture thereof.

6. A vinyl ester resin composition of claims 1, 2 or 3 wherein component (I-B-2-b) is a composition comprising
  (i) from about 70% to about 97% by weight of dicyclopentadiene;
  (ii) from about 3 to about 30 percent by weight of dimers other than dicyclopentadiene and codimers of $C_4$–$C_6$ hydrocarbons;
  (iii) from about zero to about 7 percent by weight of oligomers of $C_4$–$C_6$ dienes; and
  (iv) the balance, if any, to provide 100% by weight of $C_4$–$C_6$ alkanes, alkenes and dienes.

7. A vinyl ester resin composition of claim 6 wherein component (I-B-2-a) is phenol, resorcinol, $C_1$ to $C_9$ alkyl phenol or mixture thereof.

8. A vinyl ester resin composition of claims 1, 2 or 3 wherein component (I-B-2-b) contains at least one unsaturated hydrocarbon selected from a hydrocarbon stream containing a least 30% piperylene or 30% isoprene with the remainder being mainly $C_5$–$C_{12}$ mono- and diunsaturated hydrocarbons.

9. A vinyl ester resin composition of claim 8 wherein component (I-B-2-a) is phenol, resorcinol, $C_1$ to $C_9$ alkyl phenol or mixture thereof.

10. A vinyl ester resin composition of claims 1, 2 or 3 wherein component (I-B-2-b) contains at least one unsaturated hydrocarbon concentrate having the following concentration:
  (i) 20–70% dicyclopentadiene;
  (ii) 0–10% dimers of $C_4$–$C_6$ dienes other than dicyclopentadiene;
  (iii) 0–10% oligomers of $C_4$–$C_6$ dienes;
  (iv) the balance to provide 100% by weight of $C_4$–$C_6$ alkanes, $C_4$–$C_6$ alkenes or $C_4$–$C_6$ dienes.

11. A vinyl ester resin composition of claim 10 wherein component (I-B-2-a) is phenol, resorcinol, $C_1$ to $C_9$ alkyl phenol or mixture thereof.

12. A vinyl ester resin composition of claims 1, 2 or 3 wherein component (I-B-2-b) contains an unsaturated hydrocarbon composition comprising
  (i) 90–100% dimer of piperylene;
  (ii) 0–10% higher molecular weight oligomer of piperylene; and
  (iii) 0–4% piperylene.

13. A vinyl ester resin composition of claim 12 wherein component (I-B-2-a) is phenol, resorcinol, $C_1$ to $C_9$ alkyl phenol or mixture thereof.

14. A vinyl ester resin composition of claims 1, 2 or 3 wherein component (I-B-2-b) contains an unsaturated hydrocarbon prepared by the oligomerization of dicyclopentadiene concentrate which oligomerization product contains an average of from about 12 to about 55 carbon atoms per molecule.

15. A vinyl ester resin composition of claim 14 wherein component (I-B-2-a) is phenol, resorcinol, $C_1$ to $C_9$ alkyl phenol or mixture thereof.

16. A vinyl ester resin composition of claims 1, 2 or 3 wherein component (I-B-2-b) contains an unsaturated hydrocarbon stream containing dicyclopentadiene and at least one of
  (i) piperylene;
  (ii) isoprene;
  (iii) other $C_4$–$C_{18}$ unsaturated hydrocarbons; or
  (iv) oligomers containing an average of from about 12 to about 5 carbon atoms per molecule.

17. A vinyl ester resin composition of claim 16 wherein component (I-B-2-a) is phenol, resorcinol, $C_1$ to $C_9$ alkyl phenol or mixture thereof.

18. A vinyl ester resin composition of claims 1, 2 or 3 wherein component (I-B-2) is a product resulting from reacting in the presence of an acid catalyst
  (i) at least one aromatic hydroxyl-containing compound having only one aromatic ring, at least two aromatic hydroxyl groups and at least one ortho or para position with respect to a hydroxyl group available for ring alkylation; with
  (ii) at least one unsaturated hydrocarbon selected from
    (a) mono- and diunsaturated hydrocarbons containing 4 to 6 carbon atoms and
    (b) unsaturated hydrocarbons containing an average of 7–55 carbon atoms per molecule and containing not more than 94 weight percent dicyclopentadiene.

19. A cured composition resulting from subjecting a mixture containing (a) a vinyl ester resin composition of claims 1, 2 or 3 and (b) an effective quantity of one or more polymerization catalysts and/or accelerators to conditions for curing said mixture.

20. A cured composition of claim 19 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

21. A cured composition resulting from subjecting a mixture containing (a) a vinyl ester resin composition of claim 4 and (b) an effective quantity of one or more polymerization catalysts and/or accelerators to conditions for curing said mixture.

22. A cured composition of claim 21 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

23. A cured composition resulting from subjecting a mixture containing (a) a vinyl ester resin composition of claim 5 and (b) an effective quantity of one or more polymerization catalysts and/or accelerators to conditions for curing said mixture.

24. A cured composition of claim 23 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

25. A cured composition resulting from subjecting a mixture containing (a) a vinyl ester resin composition of claim 6 and (b) an effective quantity of one or more polymerization catalysts and/or accelerators to conditions for curing said mixture.

26. A cured composition of claim 25 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

27. A cured composition resulting from subjecting a mixture containing (a) a vinyl ester resin composition of claim 7 and (b) an effective quantity of one or more polymerization catalysts and/or accelerators to conditions for curing said mixture.

28. A cured composition of claim 27 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

29. A cured composition resulting from subjecting a mixture containing (a) a vinyl ester resin composition of claim 8 and (b) an effective quantity of one or more polymerization catalysts and/or accelerators to conditions for curing said mixture.

30. A cured composition of claim 29 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

31. A cured composition resulting from subjecting a mixture containing (a) a vinyl ester resin composition of claim 9 and (b) an effective quantity of one or more polymerization catalysts and/or accelerators to conditions for curing said mixture.

32. A cured composition of claim 31 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

33. A cured composition resulting from subjecting a mixture containing (a) a vinyl ester resin composition of claim 10 and (b) an effective quantity of one or more polymerization catalysts and/or accelerators to conditions for curing said mixture.

34. A cured composition of claim 33 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

35. A cured composition resulting from subjecting a mixture containing (a) a vinyl ester resin composition of claim 11 and (b) an effective quantity of one or more polymerization catalysts and/or accelerators to conditions for curing said mixture.

36. A cured composition of claim 35 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

37. A cured composition resulting from subjecting a mixture containing (a) a vinyl ester resin composition of claim 12 and (b) an effective quantity of one or more polymerization catalysts and/or accelerators to conditions for curing said mixture.

38. A cured composition of claim 37 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

39. A cured composition resulting from subjecting a mixture containing (a) a vinyl ester resin composition of claim 13 and (b) an effective quantity of one or more polymerization catalysts and/or accelerators to conditions for curing said mixture.

40. A cured composition of claim 39 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

41. A cured composition resulting from subjecting a mixture containing (a) a vinyl ester resin composition of claim 14 and (b) an effective quantity of one or more polymerization catalysts and/or accelerators to conditions for curing said mixture.

42. A cured composition of claim 41 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

43. A cured composition resulting from subjecting a mixture containing (a) a vinyl ester resin composition of claim 15 and (b) an effective quantity of one or more polymerization catalysts and/or accelerators to conditions for curing said mixture.

44. A cured composition of claim 43 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

45. A cured composition resulting from subjecting a mixture containing (a) a vinyl ester resin composition of claim 16 and (b) an effective quantity of one or more polymerization catalysts and/or accelerators to conditions for curing said mixture.

46. A cured composition of claim 45 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

47. A cured composition resulting from subjecting a mixture containing (a) a vinyl ester resin composition of claim 17 and (b) an effective quantity of one or more polymerization catalysts and/or accelerators to conditions for curing said mixture.

48. A cured composition of claim 47 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

49. A cured composition resulting from subjecting a mixture containing (a) a vinyl ester resin composition of claim 18 and (b) an effective quantity of one or more polymerization catalysts and/or accelerators to conditions for curing said mixture.

50. A cured composition of claim 49 wherein said polymerization catalyst is at least one of benzoyl peroxide, t-butyl perbenzoate, methyl ethyl ketone peroxide, t-butyl peroctoate or di-t-butyl peroxide and said accelerator, when present, is at least one of cobalt naphthenate, cobalt octoate, dimethyl aniline or 2,4,6-tris(dimethylaminomethyl)phenol.

* * * * *